United States Patent Office 3,154,542
Patented Oct. 27, 1964

3,154,542
4-ACYLTHIO AND 4-AROYLTHIO DERIVATIVES OF 3-KETO-Δ⁴-STEROIDS AND PROCESS FOR PREPARING SAME
Ursula Jula Hanna Bernstein, John William Ducker, Bernard Ellis, and Vladimir Petrow, all of London, England, assignors to The British Drug Houses Limited
No Drawing. Filed June 13, 1963, Ser. No. 287,490
Claims priority, application Great Britain, June 18, 1962, 23,351/62; Aug. 27, 1962, 32,780/62
17 Claims. (Cl. 260—239.55)

This invention is for improvements in or relating to organic compounds, and has particular reference to a new class of steroidal Δ⁴-3-ones substituted in the 4-position by an acylthio or aroylthio grouping.

It is an object of the present invention to provide a new class of steroidal Δ⁴-3-ones substituted in the 4-position by an acylthio or aroylthio grouping including Formula I below which compounds are of value on account of their biological properties and as intermediates for the preparation of compounds having valuable biological properties.

The invention provides the following specific new 4-substituted steroidal Δ⁴-3-ones:

4-acetylthio-17α-methyltestosterone which is of value on account of its favourable anabolic/anhdrogenic activity index, when administered by the oral route;

4-acetylthio-testosterone propionate,
4-acetylthio-19-nor-testosterone,
4-benzoylthio-testosterone propionate which are of value on account of their anabolic/androgenic properties;
4-acetylthio progesterone,
4-acetylthio-17α-acetoxyprogesterone,
4-acetylthio-11α-hydroxyprogesterone,
4-acetylthio-11β-hydroxyprogesterone,
4-acetylthio-16α,17α-isopropylidenedioxy-progesterone which are of value on account fo their progestational, claudogenic and other hormonal and antihormonal properties;

4 - acetylthio - bismethylenedioxy cortison derivative which is of value as an intermediate for the preparation of 4-acetylthio-cortisone and its esters and derivatives.

The invention also provides a process for the preparation of the 4-substituted-Δ⁴-3-ones (I), which utilises as starting materials the corresponding 4,5-epoxy-3-ones including the general Formula II below.

According to the present invention there is provided a process for the preparation of steroidal 4-substituted-Δ⁴-3-ones including the general formua

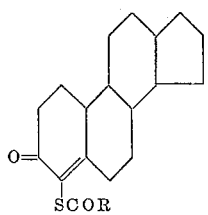

(I)

(where R is an alkyl radical containing up to three carbon atoms or an aryl radical containing up to eight carbon atoms) which process comprises reacting the corresponding steroidal 4,5-epoxy-3-one including the general formula

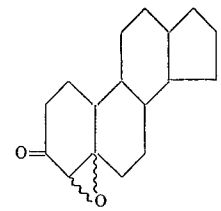

(II)

with a thio-aliphatic acid (containing up to four carbon atoms) or with a thio-aromatic acid (containing up to nine carbon atoms).

The preferred method comprises reacting the 4,5-epoxy-3-one (II), which may consist of a mixture of isomeric epoxides, with a lower thio-aliphatic or thio-aromatic acid in the absence of a solvent or catalyst, when it is converted into the required 4-substituted-Δ⁴-3-one (I).

In carrying the process of this invention into effect, the 4,5-epoxy-3-one (II) [which may consist of a mixture of 4α,5α- and 4β,5β-epoxide and preferably with the latter epoxide forming the predominant component] is dissolved in, for example, an excess of thioacetic acid or thiobenzoic acid, and the mixture allowed to stand for several hours at room temperature. Alternatively, in order to increase the speed of the reaction, the mixture may be heated at temperatures up to circa 100° C. for periods of time depending upon the particular temperature employed, until reaction is complete. Thereafter, the steroidal product is isolated by methods well-known to those skilled in the art and suitably purified.

The process of the invention may be applied to 4,5-epoxy-3-one derivatives of androstane, D-homoandrostane, 19-norandrostane, pregnane, D-homo pregnane and 19-norpregnane.

The following additional groups will not, in general, interfere with the process of the invention:

Hydroxy or acyloxy groups at positions such as C-11, 16, 17, 20 and 21; although such hydroxy groups may possibly undergo complete or partial acylation;

Oxo groups at positions such as C-11, 17 and 20;

Alkyl groups containing up to four carbon atoms, and in particular methyl groups, at positions C-1, 2, 7, 11, 16, 17 and 21;

Halogeno groups, and in particular fluoro- and chloro-groups at positions C-9, 11, 16, 17 and 21;

Isopropylidenedioxy at position 16–17 in 20-oxo pregnanes;

Bis-methylenedioxy at position 17α,20:20,21, and

Unsaturated linkages.

The starting materials of the present invention are well known in the art or may be prepared by methods established in the art.

The starting material employed in Examples 1 and 8 was prepared by propionylation of the 4β,5β-epoxide derived from testosterone. It crystallised from methanol in plates, M.P. 156 to 157° C. $[\alpha]_D^{25} +122°$, (c., 1.1 in $CHCl_3$).

The starting material employed in Example 6 was prepared as follows:

A stirred suspension of 16α,17α-isopropylidenedioxy-pregn-4-ene-3,20-dione (5 g.) in methanol (330 ml.) was treated at 15° C. with 4 N aqueous sodium hydroxide (10 ml.) and 30% hydrogen peroxide (17 ml.). The mixture was cooled to 0° C. and maintained at this temperature for 1½ hours. Thereafter, it was allowed to reach room temperature during one hour, acidified with acetic acid, and poured into water. The precipitated solid was collected and crystallised from aqueous methanol to give the 4,5-epoxide of 16α,17α-isopropylidenedioxy-pregn-4-ene-3,20-dione, needles, M.P. 154 to 159° C.

The 4,5-epoxide starting material employed in Example 9 was prepared from 19-nor-androst-4-ene-3,17-dione in a similar manner. It crystallised from aqueous methanol in shiny plates, M.P. 166 to 168° C.

The 4,5-epoxide starting material employed in Example 10 was prepared from the bismethylenedioxy derivative of cortisone in a similar manner. It crystallised from methanol in plates, M.P. 290 to 292° C.

The process of the invention may be used in the preparation of 4-acylthio or aroylthio derivatives of the following steroids and acyl derivatives thereof:

Testosterone, 2-methyl testosterone, 17α-methyl testosterone and their 9(11)-dehydro, 11-oxo and 11-hydroxy derivatives.

17α-acyloxyprogesterone and its 9(11)-dehydro, 11-oxo and 11-hydroxy derivatives.

16-methyl-17α-acyloxyprogesterone and its 9(11)-dehydro, 11-oxo and 11-hydroxy derivatives.

21-fluoro-16-methyl-17α-acyloxyprogesterone and its 9(11)-dehydro, 11-oxo and 11-hydroxy derivatives.

16-methylene-17α-acyloxyprogesterone and its 9(11)-dehydro, 11-oxo and 11-hydroxy derivatives.

21-fluoro-16-methylene-17α - acyloxyprogesterone and its 9(11)-dehydro, 11-oxo and 11-hydroxy derivatives.

17α-acyloxy-16-ethylideneprogesterone.

16α,17α-isopropylidenedioxyprogesterone and its 9(11)-dehydro, 11-oxo and 11-hydroxy derivatives.

Cortisone bismethylenedioxy derivative.

16-methyl cortisone bismethylenedioxy derivative.

16-methylene cortisone bismethylenedioxy derivative.

The 16α,17α-isopropylidene derivative of 16α-hydroxy cortisone.

Hydrocortisone bismethylenedioxy derivative.

16-methyl hydrocortisone bismethylenedioxy derivative.

The 16α,17α-isopropylidenedioxy derivative of 16α-hydroxyhydrocortisone.

The bismethylenedioxy derivative of 17α,21-dihydroxy-pregna-4,9(11)-diene-3,20-dione.

The bismethylenedioxy derivative of 16-methyl-17α,21-dihydroxypregna-4,9(11)-diene13,20-dione.

The bismethylenedioxy derivative of 16-methylene-17α,21-dihydroxypregna-4,9(11)-diene-3,20-dione.

The 16α,17α-isopropylidenedioxy derivative of 16α,17α,21-trihydroxypregna-4,9(11)-diene-3,20-dione.

21-fluoro-16α,17α-isopropylidenedioxypregna - 4,9(11)-diene-3,20-dione.

21-fluoro-16α,17α-isopropylidenedioxypregn-4-ene-3,11,20-trione.

21 - fluoro - 11 - hydroxy-16α,17α-isopropylidenedioxy-pregn-4-ene-3,20-dione.

21-fluoro-17α-acyloxyprogesterone and its 9(11)-dehydro, 11-oxo and 11-hydroxy derivatives.

Progesterone and its 9(11)-dehydro, 11-oxo and 11-hydroxy derivatives.

16-methyl progesterone, 16α,17α-cyclomethylene progesterone and 16α,17α-cycloethylidene progesterone.

21-fluoro progesterone, 19-nor progesterone.

Androst-4-ene-3,17-dione and its 2-methyl, 16-methyl and 2,16-diethyl derivatives.

11-oxo, 11-hydroxy and the 9(11)-dehydro derivatives of androst-4-ene-3,17-dione.

19-norandrost-4-ene-3,17-dione.

19-nortestosterone and 17α-methyl-19-nor-testosterone.

Following is a description by way of example of methods of carrying the invention into effect.

EXAMPLE 1

*4-Acetylthio Testosterone Propionate*

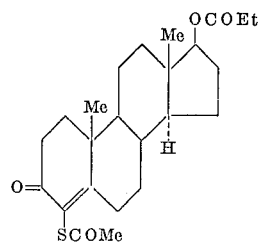

A solution of the 4β,5β-epoxide (2.2 g.) derived from testosterone propionate, in thioacetic acid (5 ml.), was heated on a steam-bath for 7 hours. Ether (150 ml.) was added, the mixture washed with aqueous sodium carbonate, then with water, dried and the solvent removed. Crystallisation of the residue from aqueous methanol gave 4-acetylthiotestosterone propionate, as rods, M.P. 142 to 144° C., $[\alpha]_D^{26}$ +114° (c., 1.04 in CHCl$_3$), $\lambda_{max.}^{EtOH}$ 234 to 235 m$\mu$ ($\epsilon$, 11,010), $\nu_{max.}^{CCl_4}$ 1735, 1703 and 1678 cm.$^{-1}$, $\nu_{max.}^{CH_2Cl_2}$ 1564 cm.$^{-1}$

EXAMPLE 2

*4-Acetylthio Progesterone*

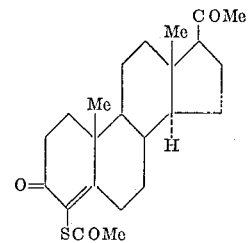

A solution of mixed 4,5-epoxides (3 g.) (British Patent 838,771) derived from progesterone, in thioacetic acid (8 ml.) was heated on the steam bath for 2½ hours. The product was isolated by the method of Example 1 and purified from aqueous methanol. 4-acetylthio progesterone separated in needles, M.P. 177 to 179° C., $[\alpha]_D^{26}$ +156°, $\lambda_{max.}^{EtOH}$ 235 to 237 m$\mu$

EXAMPLE 3

*4-Acetylthio-11α-Hydroxyprogesterone*

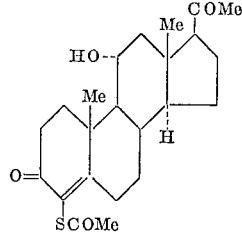

A solution of the 4,5-epoxide (2 g.) (British Patent 838,771) derived from 11α-hydroxyprogesterone, in thioacetic acid (5 ml.) was heated on the steam bath for 5 hours. The product was isolated by the method described in Example 1, and crystallised from aqueous methanol. 4 - acetylthio - 11α - hydroxyprogesterone separated in needles, M.P. 202 to 203° C., $[\alpha]_D^{26}$ +132° (c., 1.0 in CHCl$_3$), $\lambda_{max.}^{EtOH}$ 234 m$\mu$ ($\epsilon$ = 10,640)

EXAMPLE 4

*4-Acetylthio-11β-Hydroxyprogesterone*

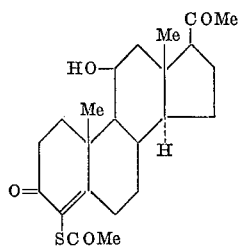

A solution of the 4,5-epoxide (2.5 g) (British Patent 838,771) derived from 11β-hydroxyprogesterone, in thioacetic acid (7 ml.), was heated on the steam bath for 6 hours. The products was isolated by the method described in Example 1, and purified from aqueous methanol. 4-acetylthio-11β-hydroxyprogesteron crystallised in needles, M.P. 199 to 201° C., $[\alpha]_D^{24}$ +174° (c., 1.1 in CHCl$_3$), $\lambda_{max.}^{EtOH}$ 235.5 mμ ($\epsilon$ = 10,440)

EXAMPLE 5

*4-Acetylthio-17α-Acetoxyprogesterone*

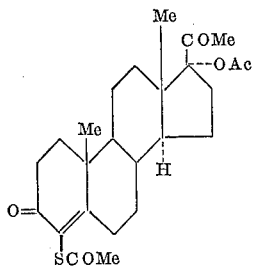

A solution of 4,5-epoxide (2 g.) (British Patent 839,908) derived from 17α-acetoxyprogesterone, in thioacetic acid (5 ml.) was heated on the steam bath for 2 hours. The product was isolated by the method described in Example 1, and purified from aqueous methanol to give 4-acetylthio-17α-acetoxyprogesterone, needles, M.P. 195 to 197° C., $[\alpha]_D^{24}$ +78° (c., 0.94 in CHCl$_3$).

EXAMPLE 6

*4-Acetylthio-16α,17α-Isopropylidenedioxy Progesterone*

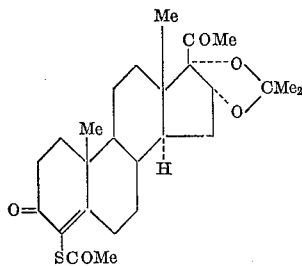

A solution of the 4,5-epoxide (3 g.) derived from 16α,17α-isopropylidenedioxy progesterone, in thioacetic acid (6 ml.) was heated on the steam bath for 2 hours. The product was isolated by the method described in Example 1, and purified from aqueous methanol to give 4-acetylthio-16α,17α-isopropylidenedioxy progesterone, needles, M.P. 191 to 193° C., $[\alpha]_D^{24}$ +152° (c., 1.02 in CHCl$_3$), $\lambda_{max.}^{EtOH}$ 235 mμ ($\epsilon$ = 11,190)

EXAMPLE 7

*4-Acetylthio-17β-Hydroxy-17α-Methylandrost-4-En-3-One*

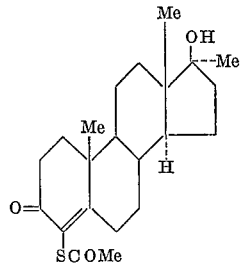

A solution of 4,5-epoxide derived from 17α-methyl testosterone (1 g., mixture of α and β-isomers) (U.S. Patent 2,885,398) in thioacetic acid (2 ml.) was left for 18 hours at room temperature. Ether (100 ml.) was added, and the mixture washed neutral with aqueous sodium carbonate, dried, and the solvent evaporated. The gummy residue was dissolved in benzene and the solution passed through a column of alumina. Elution with benzene gave a gum which crystallised from hexane-ether to give 4-acetylthio-17β-hydroxy-17α-methylandrost-4-en-3-one as prisms, M.P. 165 to 166° C., $[\alpha]_D^{23}$ +88 (c., 1.02 in chloroform), $\nu_{max.}^{Nujol}$ 3500, 1700, 1665 and 1565 cm.$^{-1}$, $\lambda_{max.}^{EtOH}$ 235 to 237 mμ (log $\epsilon$ 4.02)

EXAMPLE 8

*4-Benzoylthio Testosterone Propionate*

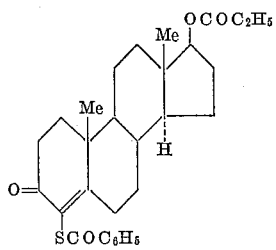

A solution of the 4β,5β-epoxide (1 g.) derived from testosterone propionate, in thiobenzoic acid (2 ml.) was heated on the steam bath for 2 hours. The product was isolated by the method of Example 1 and purified from methanol. 4-benzoylthio testosterone propionate separated in needles, M.P. 174 to 176° C., $[\alpha]_D^{25}$ +141° (c., 1.0 in CHCl$_3$), $\lambda_{max.}$ 243 mμ ($\epsilon$=21,530).

EXAMPLE 9

*4-Acetylthio-19-Norandrost-4-Ene-3,17-Dione*

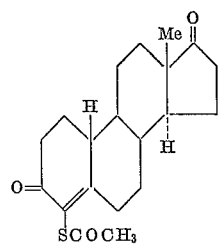

A solution of the 4,5-epoxide (1 g.) derived from 19-norandrost-4-ene-3,17-dione, in thioacetic acid (2 ml.), was heated on the steam bath for 2 hours. The product was isolated by the method described in Example 1, and purified from methanol. 4-acetylthio-18-norandrost-4-ene-3,17-dione separated in needles, M.P. 224 to 225° C., $[\alpha]_D^{25}$ +155.5 (c., 0.8 in chloroform), $\lambda_{max.}$ 233 to 234 mμ ($\epsilon$=11,100).

EXAMPLE 10

*4-Acetylthio Bismethylenedioxy Cortisone Derivative*

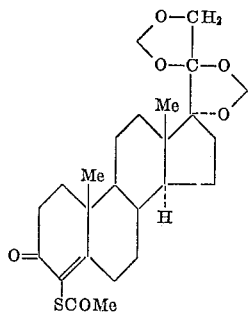

A solution of the 4,5-epoxide (1 g.) derived from the bismethylenedioxy derivative of cortisone, in thioacetic acid (2 ml.), was heated on the steam bath for 2 hours. The product was isolated by the method described in Example 1, and purified from methanol. The 4-acetylthio bismethylenedioxy derivative of cortisone separated in needles, M.P. ca. 248 to 250° C.

EXAMPLE II

*4-Acetylthio-19-Nortestosterone*

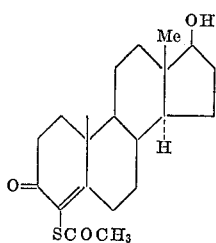

A solution of the 4,5-epoxide (1 g.) (U.S. Patent 2,908,682) derived from 19-nortestosterone, in thioacetic acid (2 ml.), was heated on the steam bath for 2 hours. The product, isolated by the method described in Example 1, was characterised by $\lambda_{max}$. 233 to 234 m$\mu$ ($\epsilon$=11,000).

We claim:

1. A process for the preparation of a 3-keto-$\Delta^4$-steroid compound having an —SCOR group attached to the number four carbon atom of the steroid nucleus, where R is selected from the group consisting of alkyl containing up to three carbon atoms and aryl containing up to eight carbon atoms, comprising reacting the corresponding 3-keto-4,5-epoxy steroid with an acid selected from the group consisting of thio-aliphatic acids containing up to four carbon atoms and thio-aromatic acids containing up to nine carbon atoms to give the said 3-keto-$\Delta^4$-steroid substituted in the 4-position.

2. A process as claimed in claim 1 wherein the 3-keto-4,5-epoxy steroid consists of a mixture of isomeric epoxides.

3. A process as claimed in claim 1 wherein the 3-keto-4,5-epoxy steroid is reacted with the acid in the absence of solvents and catalysts.

4. A process as claimed in claim 1 wherein the thio-aliphatic acid is thio-acetic acid.

5. A process as claimed in claim 1 wherein the thio-aromatic acid is thiobenzoic acid.

6. A 3-keto-$\Delta^4$-steroid compound having a —SCOR group attached to the number 4 carbon atom of the steroid nucleus, where R is selected from the group consisting of alkyl containing up to three carbon atoms and aryl containing up to eight carbon atoms, said compound having at the 17-position a side chain selected from the group consisting of those characterizing pregnane and androstane compounds.

7. 4-acetylthio-testosterone propionate.
8. 4-acetylthio-17α-methyltestosterone.
9. 4-acetylthio-19-nor-testosterone.
10. 4-benzoylthio-testosterone propionate.
11. 4-acetylthio progesterone.
12. 4-acetylthio-17α-acetoxyprogesterone.
13. 4-acetylthio-11α-hydroxyprogesterone.
14. 4-acetylthio-11β-hydroxyprogesterone.
15. 4 - acetylthio-16α,17α-isopropylidenedioxy progesterone.
16. 4-acetylthio-bismethylenedioxy cortisone.
17. 4-acetylthio-19-norandrost-4-ene-3,17-dione.

References Cited by the Examiner

UNITED STATES PATENTS 2,933,510  4/60  Julian et al. _____ 260–397.3

LEWIS GOTTS, *Primary Examiner.*